Nov. 1, 1927.

R. M. ADAMS

WEEDING MACHINE

Filed Oct. 13, 1926

Inventor
R. M. Adams

By Philip A. H. Ferrell
Attorney

Patented Nov. 1, 1927.

1,647,680

UNITED STATES PATENT OFFICE.

RALPH M. ADAMS, OF SIDNEY, NEBRASKA.

WEEDING MACHINE.

Application filed October 13, 1926. Serial No. 141,287.

The invention relates to an improved scarifying machine and seeks among other things to provide an agricultural machine for pulverizing the surface of the soil and conserving the moisture therein and to destroy weeds so that they will not sap the moisture therein and the substance from the soil. The device is particularly adapted for use in a semi-arid country where it is necessary to conserve moisture, which moisture is conserved by preventing growth of weeds as well as preventing its evaporation.

A further object is to provide a summer tilling machine comprising a transversely disposed bar having upwardly and rearwardly extending arms terminating in bearing members in which are rockably mounted shafts and a rearwardly extending bar having toothed segments with which the levers carried by the rockable shafts cooperate. Also to provide hingedly mounted frames connected to the transversely disposed bar and having rearwardly and downwardly and forwardly extending arms connected to the ends of angularly disposed cutter blades, and rearwardly extending arms carried by the rockable shafts and having link connections with the rearwardly, downwardly and forwardly extending arms carried by the hinged frame.

A further object is to provide a U-shaped brace having diverging arms, the ends of which arms are anchored to the transversely disposed bar and which arms extend over the hinged frames under the rockable shafts and have their connecting portions anchored to the rearwardly extending bar, said arm having upwardly arched portions for allowing freedom of movement of the hinged frames beneath the same.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
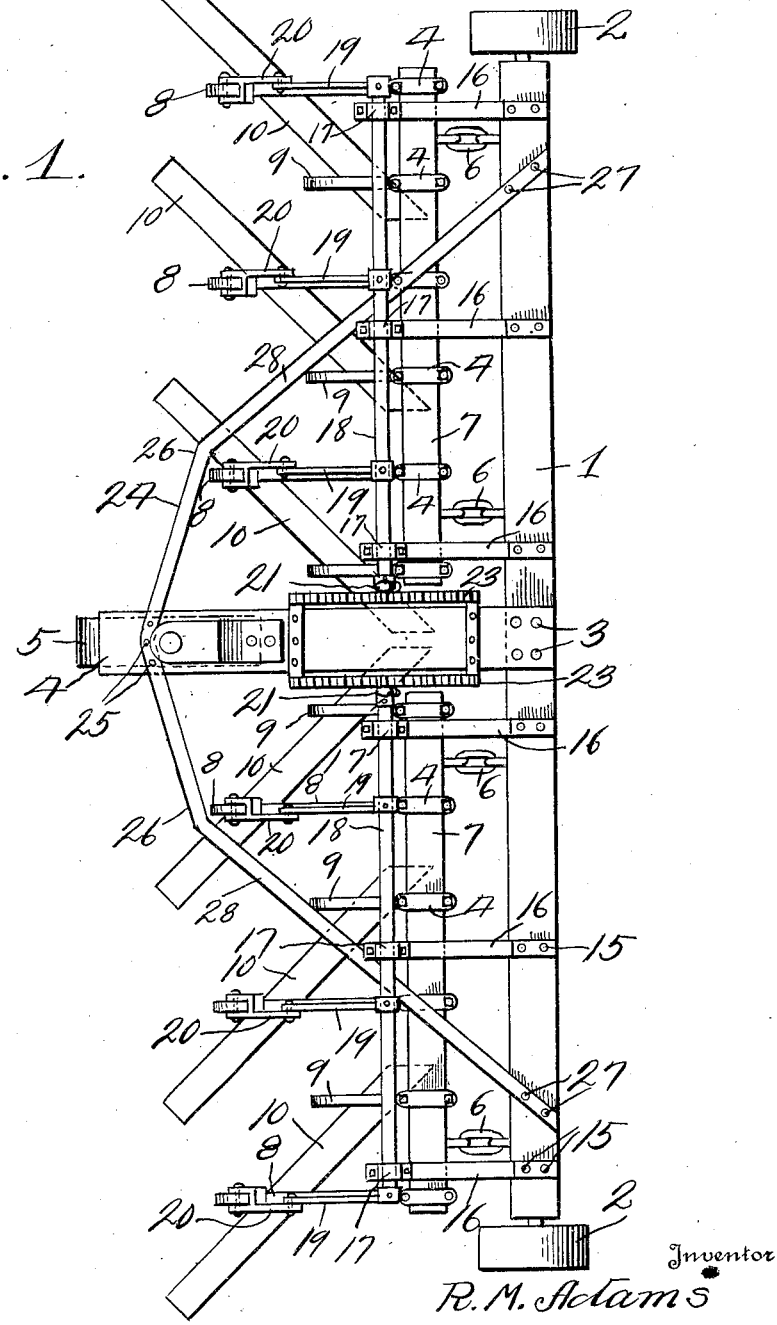
Figure 1 is a plan view of the machine.
Figure 2:
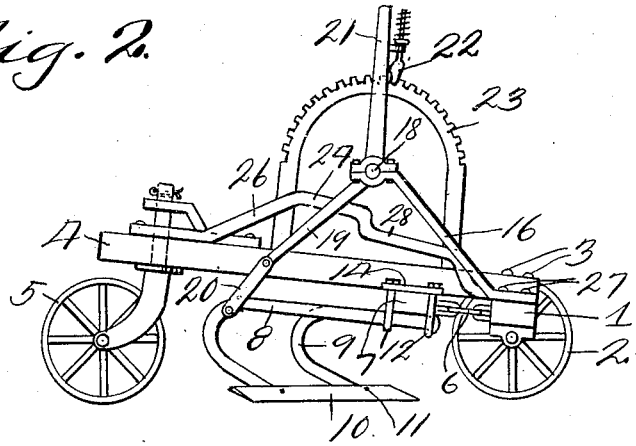
Figure 2 is a side elevation of the machine.
Figure 3:
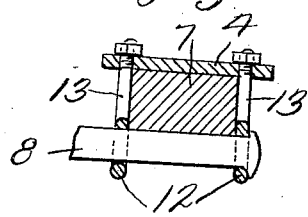
Figure 3 is a vertical transverse sectional view through the hinged bar showing the connecting means for the blade supporting arm.
Figure 4:
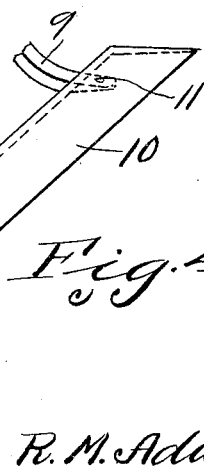
Figure 4 is a perspective view of one of the blades.

Referring to the drawings, the numeral 1 designates the transversely disposed bar, which bar is supported at its ends by means of ground engaging wheels 2. Secured to the transversely disposed bar 1 at 3 is a rearwardly extending bar 4, the rear end of which is supported by a ground engaging caster wheel 5, which caster wheel allows the device to be easily turned and easily guided during a weed cutting operation. Disposed rearwardly of the bar 1 and hingedly connected thereto by means of links 6 are bars 7, which bars have connected thereto rearwardly, downwardly and forwardly extending arms 8 and 9. The arms 9 are shorter than the arms 8 and extend under the inclined and angularly disposed weed cutting blades 10, and are secured thereto at 11, therefore it will be seen that the blades 10 are rigidly supported. The inner ends of the arms 8 and 9 extend upwardly at opposite sides of the bars 7 and through the ends of plates 14, therefore it will be seen that when said eye bolts 13 are tightened, the bars 8 and 9 are rigidly held and at the same time the bars 7 are not weakened as would be the case if the arms 8 and 9 extend through openings therein.

Secured to the bar 1 at 15 are upwardly and rearwardly extending arms 16, which arms terminate in bearing members 17 disposed above bars 7. Rockably mounted in the bearing members 17 are rock shafts 18, which rock shafts at opposite sides of the machine are preferably in axial alinement, and are provided with rearwardly and downwardly extending arms 19, which have link connections 20 with the rearwardly extending arms 8, therefore it will be seen by rocking the shafts 18 either set of weed cutting blades 10 can be easily transported from place to place, and when lowered can be forced into the ground as the machine moves forwardly for severing the weeds beneath the surface of the ground and tilling the soil, thereby preventing the weeds from growing and insuring the death thereof, consequently conserving the moisture. The inner adjacent ends of the rock shafts 18 are provided with operating levers 21, which levers extend upwardly and are provided with latches 22 which cooperate with the toothed segments 23 carried by the bar 4 for holding the blades 10 in adjusted positions. By providing separable controlling means for the blades at opposite sides of the machine, it is obvious the operator can use either or both sides as desired. It will be noted that the blades at opposite sides of the machine are in opposed relation, therefore during the use of both sides of the machine, not only shearing action is insured for the severing operation, but at the same time, side movement of the machine will be prevented as the strain will be equal at both sides thereof. Rearwardly extending bar 4 is braced by the U-shaped brace 24, which brace is anchored at 25 to the bar 4 and has its arms 26 extending forwardly in diverging relation, under the shafts 18, over the bars 7 and are anchored at 27 adjacent the ends of the transversely disposed bar 1, therefore it will be seen the machine is thoroughly braced as well as the bar 4. Arms 26 are provided with upwardly offset portions 28, which allow freedom of movement of the bars 7 and the rearwardly extending arms 8 and 9, especially when these parts are raised by the operator.

From the above it will be seen that a summer tilling and weed cutting machine is provided which is simple in construction, the parts reduced to a minimum, and one wherein the structure is compact, and there is freedom of movement of the arms 8 and bar 7 beneath the upwardly bent brace arms 26. It will also be seen that by converging the cutter blades 10 inwardly from either side of the machine with the blades in the ground the strains from both sides of the machine will be inwardly, thereby insuring the holding the the machine to its work.

The invention having been set forth what is claimed as new and useful is:—

1. A machine of the character described comprising a transversely disposed bar, wheels carried by the ends of said bar, a rearwardly extending bar, bars pivotally connected to the rear side of the transversely disposed bar, rearwardly, downwardly and forwardly extending arms carried by the pivoted bar, forwardly and inwardly extending cutter blades carried by the rearwardly extending arms, upwardly and rearwardly extending arms carried by the transversely disposed bar, bearing members carried by the upper ends of said arms, rock shafts rockably mounted in said bearing members, levers carried by the adjacent ends of the rock shafts, spaced toothed segments carried by the rearwardly extending bar and with which the levers cooperate, rearwardly extending arms carried by the rock shafts, and link connections between the rearwardly extending arms last mentioned and the rearwardly extending arms of the pivotally mounted bars.

2. The combination with a machine of the character described comprising a transversely disposed bar, hinged bars carried by the transversely disposed bar, weeding elements carried by the hinged bars, control rock shafts supported above and rearwardly of the transversely disposed bar, arms carried by the rock shafts and extending rearwardly and downwardly, link connections between said last named arms and the hinged bars, of a U-shaped brace having its arms anchored to the transversely disposed bar adjacent the ends thereof, a rearwardly extending bar carried by the transversely disposed bar, the rear end of said U-shaped brace being anchored adjacent the rear end of the rearwardly extending bar, the arms of said U-shaped bar extending under the rock shafts and having upwardly extending arched portions above the bars.

In testimony whereof I hereunto affix my signature.

RALPH M. ADAMS.